(12) United States Patent
Howell

(10) Patent No.: US 10,929,595 B2
(45) Date of Patent: Feb. 23, 2021

(54) DIGITAL STORY GENERATION

(71) Applicant: StoryForge LLC, St. Paul, MN (US)

(72) Inventor: Eric Howell, St. Paul, MN (US)

(73) Assignee: StoryForge LLC, St. Paul, MN (US)

( * ) Notice: Subject to any disclaimer, the term of this patent is extended or adjusted under 35 U.S.C. 154(b) by 0 days.

(21) Appl. No.: 16/407,908

(22) Filed: May 9, 2019

(65) Prior Publication Data

US 2019/0347318 A1    Nov. 14, 2019

Related U.S. Application Data

(60) Provisional application No. 62/669,434, filed on May 10, 2018.

(51) Int. Cl.
G06F 40/166 (2020.01)
G06T 11/60 (2006.01)
G06K 9/00 (2006.01)
G06F 3/16 (2006.01)
G06F 40/114 (2020.01)

(52) U.S. Cl.
CPC ........... G06F 40/166 (2020.01); G06F 3/165 (2013.01); G06F 40/114 (2020.01); G06K 9/00255 (2013.01); G06T 11/60 (2013.01)

(58) Field of Classification Search
CPC ...... G06F 40/166; G06F 40/114; G06F 3/165; G06K 9/00255; G06T 11/60
USPC ........................................................ 715/202
See application file for complete search history.

(56) References Cited

U.S. PATENT DOCUMENTS

| 6,232,966 | B1 | 5/2001 | Kurlander |
| 8,327,253 | B2 | 12/2012 | Han et al. |
| 8,422,852 | B2 | 4/2013 | Suri et al. |
| 2003/0018663 | A1 | 1/2003 | Cornette et al. |
| 2005/0055624 | A1 | 3/2005 | Seeman et al. |
| 2007/0256011 | A1* | 11/2007 | Jones ..................... G06F 40/186 |
| 2010/0110081 | A1 | 5/2010 | Arora et al. |
| 2012/0210200 | A1* | 8/2012 | Berger .................. G06F 3/0481 715/202 |
| 2013/0145240 | A1* | 6/2013 | Anderson ............. G06F 3/0483 715/201 |
| 2014/0310746 | A1* | 10/2014 | Larsen ................. H04N 21/242 725/37 |
| 2014/0351679 | A1 | 11/2014 | Tobita |
| 2015/0143209 | A1* | 5/2015 | Sudai .................... G06F 40/186 715/202 |
| 2016/0125632 | A1* | 5/2016 | Yu ....................... G06F 3/04845 715/731 |

(Continued)

FOREIGN PATENT DOCUMENTS

WO    2017218043 A1    12/2017

OTHER PUBLICATIONS

Spear, Rebecca, "Best Comic Book Software of 2018," https://web.archive.org/web/20171223201031/https://www.toptenreviews.com/software/entertainment/best-comic-book-software/, Dec. 18, 2017, 21 pages.

Primary Examiner — Stephen S Hong
Assistant Examiner — Broderick C Anderson
(74) Attorney, Agent, or Firm — Merchant & Gould P.C.

(57) ABSTRACT

A digital story includes textual, visual, and/or audio aspects. Generation of a new digital story and/or editing of an existing digital story can include, for instance, coordinating presentation of textual, visual, and/or audio aspects of the digital story. A digital story can be viewed and/or accessed by a user remote from one or more authors of the digital story.

3 Claims, 8 Drawing Sheets

(56) References Cited

U.S. PATENT DOCUMENTS

| | | | |
|---|---|---|---|
| 2016/0217699 A1* | 7/2016 | Thankavel | G09B 5/06 |
| 2016/0275067 A1 | 9/2016 | Mei et al. | |
| 2017/0235738 A1 | 8/2017 | Spaulding | |
| 2017/0242833 A1 | 8/2017 | Rakshit et al. | |
| 2019/0173690 A1* | 6/2019 | McCue | G06F 9/45558 |

* cited by examiner

DIGITAL STORY GENERATION

INTRODUCTION

Storytelling can be a way to communicate history, to entertain, to educate, and to bond with other people. Over time, people have communicated storytelling in various mediums. Books are a common medium for storytelling. Graphic novels are another medium used for storytelling.

SUMMARY

Embodiments of the disclosure are directed to digital stories. Generally, systems and methods disclosed herein generate and/or edit a digital story. Presentation of a digital story can include coordination of various aspects, such as visual, audio, and textual components of the digital story.

In one aspect, a digital story editing system is disclosed. The example digital story editing system includes at least one processor and memory. The memory encodes computer executable instructions that, when executed by at least one processor, cause the digital story editing system to: receive a digital story, where the digital story includes a plurality of content pages; provide a sound effect module programmed to receive a digital sound effect file; provide a soundtrack module programmed to receive a digital music file; provide a timeline module programmed to provide controls for playback of the digital sound effect file and/or the digital music file; provide a face replacement module programmed to receive a digital image file and selectably replace a character face with at least a portion of the digital image file; provide a page order management module programmed to arrange the plurality of content pages in a given order; provide a sharing module programmed to enable collaboration and viewing between remote parties; and provide a pacing module programmed to control an amount of time each of the plurality of content pages are displayed during a presentation of the digital story. The details of one or more embodiments are set forth in the accompanying drawings and the description below. Other features, objects, and advantages of these embodiments will be apparent from the description, drawings, and claims.

DESCRIPTION OF THE FIGURES

The following drawing figures, which form a part of this application, are illustrative of described technology and are not meant to limit the scope of the disclosure in any manner.

DETAILED DESCRIPTION

Figure 1:
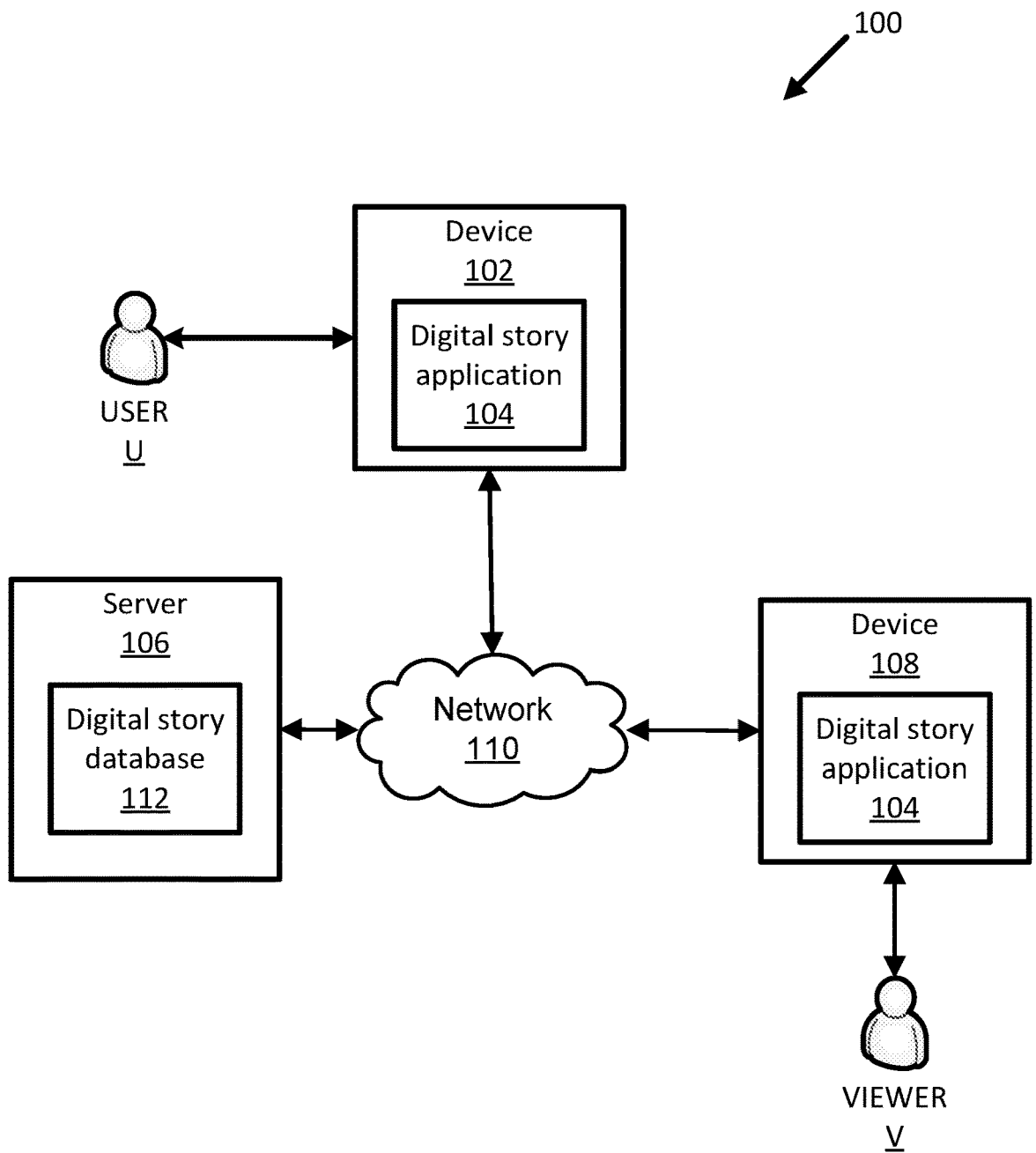
FIG. 1 illustrates an example digital story environment.

Various embodiments of the present disclosure will be described in detail with reference to the drawings, wherein like reference numerals represent like parts and assemblies throughout the several views.

Broadly, the present disclosure is directed to digital stories. Systems and methods of this disclosure are directed towards digital story generation and/or digital story editing.

In an exemplary implementation, a user accesses a digital story using a computing device hosting a digital story application. The digital story includes one or more pages, where each page includes textual, visual, and/or audio aspects. Examples of these aspects include, without limitation, drawings, photographs, animations, videos, musical tracks, dialogue, and sound effects. The digital story application can enable a user to advance page by page or the digital story application can coordinate presentation of each page in the digital story. Digital story presentation in a viewer can include coordination of presentation of the textual, visual, and/or audio aspects of each page. Resulting digital stories can be shared and accessed by viewers remote from the user (or users) who generated the digital story. These and other aspects are described in greater detail below.

FIG. 1 shows example digital story environment 100. Example digital story environment 100 includes device 102, server 106, and device 108. User U interacts with digital story application 104 accessible via device 102. Viewer V accesses digital story application 104 via device 108. Server 106, including digital story database 112, is in communication with device 102 and device 108 via network 110. Other embodiments can include more or fewer components.

Example digital story environment 100 enables content editing and generation by user U, which is in turn viewed by viewer V. Broadly, content generated and/or edited in example system 100 includes various types of written and/or pictorial communication. For instance, content can include literature that can be expressed in visual form. In various embodiments, content edited and generated by digital story environment 100 includes, for example and without limitation, graphic novels, books such as children's books and young adult books, comic books, and greeting cards. For discussion purposes only, content edited and/or generated by digital story environment 100 will be referred to herein as "a digital story" or "digital stories."

User U generates and/or modifies a digital story using digital story application 104. User U is a person who generates original content and/or edits previously created content. As examples, user U can be an original author, a fan of the subject and/or author, a celebrity, a parent, a sibling, etc.

Viewer V views the digital story generated by user U via digital story application 104. Viewer V may or may not be familiar with user U. For instance, viewer V may be a fan of user U. As another example viewer V can be a family member of user U. As another example, viewer V may be a student viewing digital content created by user U as part of coursework and/or classroom activities.

Digital story application 104 enables digital story content generation and editing. Digital story application 104 also enables sharing of digital stories generated/edited by digital story application 104. Digital story application 104 can be stored and accessed in various ways. For instance, digital story application 104 can be stored in memory devices of device 102 and device 108 or stored on server 106 and accessed remotely. Additional functionalities and components of digital story application 104 are discussed below with reference to FIG. 2.

Typically, digital story application 104 accesses a digital story by communicating with server 106 over network 110, where server 106 is in communication with digital story database 112. In some implementations, digital story application 104 interfaces with another application such that digital story generation, editing, and/or viewing occurs within that other application. For example, digital story application 104 is a plug-in or add-in for another application. In other instances, digital story application 104 is a stand-alone application or executable application file.

Device 102 and device 108 include some or all of the computing components shown in, and described with reference to, FIG. 8. For example, device 102 and/or device 108 can be: a general computing device, a tablet computing device, a smartphone, a wearable computing device (such as an augmented reality device), a mobile computing device, or other similar device.

Server 106 communicates with, and provides various functionalities of, digital story application 104. In some instances, server 106 hosts digital story database 112. Digital story database 112 includes one or more data stores for digital stories generated by user U (as well as any other users). In turn, device 108 can access the digital story generated by user U by communicating with server 106 and/or digital story database 112.

As mentioned, device 102 and device 108 communicate with the server 106 over network 110. Network 110 is a data communication network that facilitates data communication between two or more of device 102, server 106, and device 108. Network 110 may be any type of wired or wireless network, for example, the Internet, cellular, an intranet, a wide area network (WAN), a local area network (LAN), Bluetooth, and a virtual private network (VPN).

Figure 2:
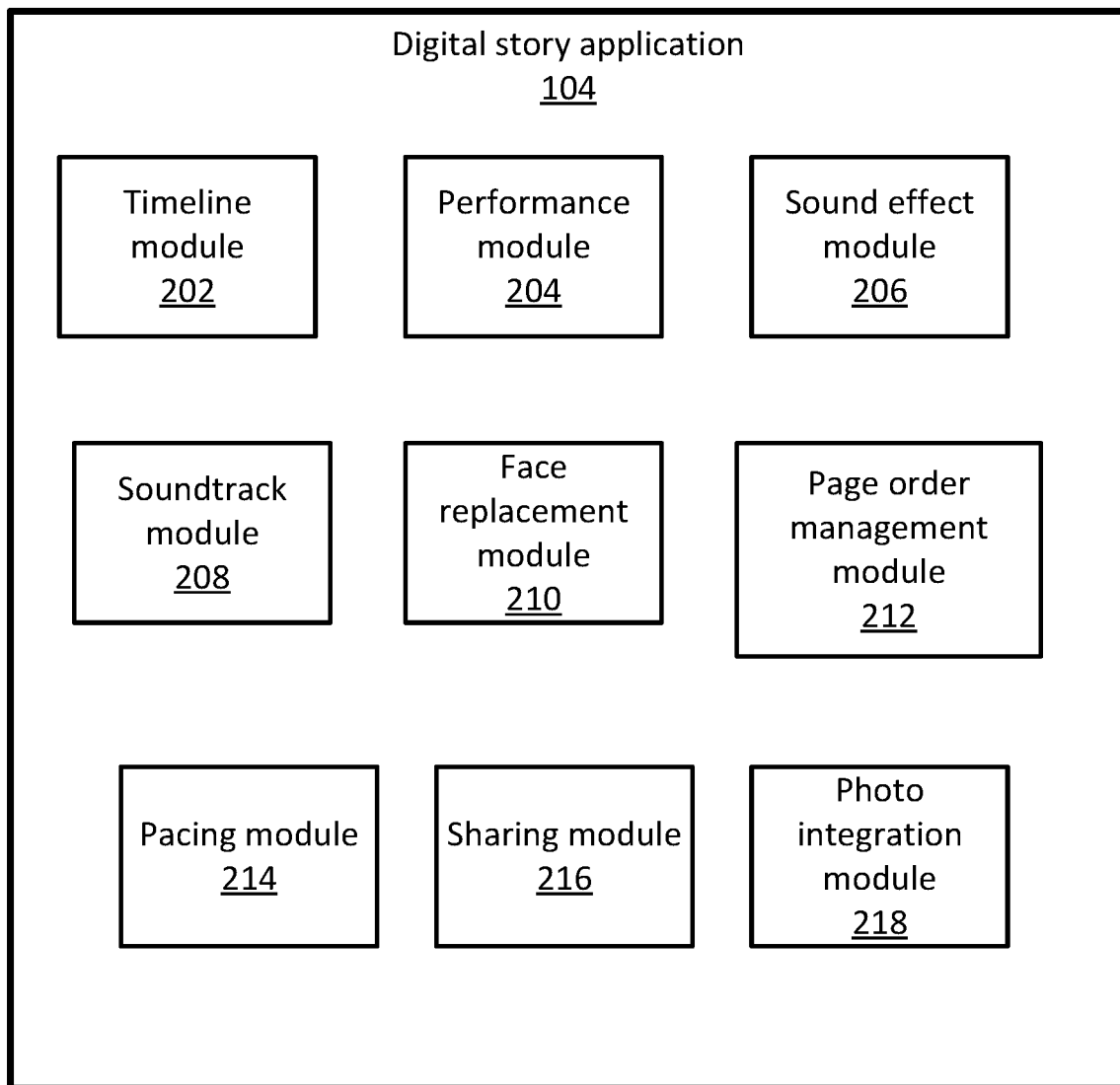
FIG. 2 is a schematic view of example modules included in an example digital story application used in the environment of FIG. 1.

FIG. 2 is a schematic depiction of example modules included in digital story application 104. The example modules provide various functionalities of digital story application 104, including creating and/or editing digital stories. Other implementations can include more or fewer components.

Timeline module 202 enables coordination of various playback aspects during display of a page or pages of a digital story. In some instances, timeline module 202 causes display on a display screen of one or more timelines as it relates to a given page. That is, a page having visuals and/or text can have a timeline component as well, where that timeline component shows one or more timing sequences.

For example, timeline module 202 can track, coordinate, and/or display timing sequencing of visuals, sound effects, voice and/or dialogue, soundtrack audio, performance components, and other functionalities contemplated herein. In some embodiments, timeline module 202 can show timelines in absolute scale; that is, starting at zero seconds and extending until the user has decided to stop playback or presentation of the particular page. In some embodiments, timeline module 202 shows relative timing of the various sound components to be presented with the page (e.g. sound effects, soundtrack, voice, etc.).

Performance module 204 can receive and present various types of audio and/or visual performances. For example, performance module 204 can receive and record a user reading text (the text typically being displayed on the page), as well as comments made by a user about the page. It will be understood that a user can include one or more different people, for example, a group of people performing different characters in a story.

In some embodiments, performance module 204 enables collaboration and/or broadcasting of real time recordings of visual or audio material. In some instances, performance module 204 enables a user to capture, import, and/or utilize motion and performance capture, which can be displayed within the digital story. Presentation of various aspects captured and managed by performance module 204 can by synchronized with other aspects, such as voice, sound, and music.

Sound effect module 206 enables sound effect recording and/or sound effect replacement functionalities. Sound effect module 206 can include a data store of various types of sound effects usable by a user generating or editing a digital story. Sound effect module 206 can display all of the original sound effects on a timeline and enable manipulation of those sound effects, specifically the timing and/or type of sound effect. Sound effect module 206 also enables replacement of sound effect tracks on the timeline. Sound effect module 206 can also enable recording of new sounds, for example, by interfacing with one or more microphone devices. Additionally, sound effect module 206 can access and/or import media files from external locations to supplement available sound effect options.

Soundtrack module 208 enables management of digital music tracks. Example soundtrack management operations provided by soundtrack module 208 include adding, moving, replacing, and/or deleting digital music files within a soundtrack timeline. Soundtrack module 208 can interface with one or more external music services to access and/or play parts or all of various digital audio tracks. Example third party music streaming applications include, but are not limited to, Spotify, iTunes, Napster, and Tidal. In some instances, soundtrack module 208 can enable recording from a phone, computing device, tablet, or other musical recording device, such that the user can record their own musical track and use it during playback of the digital story.

Face replacement module 210 enables replacement and/or integration of faces from photographs accessible by a user with one or more character faces depicted in the digital story. In some implementations, face replacement module 210 is configured to use various infrared and/or three dimensional imaging technology to capture facial features and apply those facial features to one or more characters in the story. In some embodiments, face replacement module 210 can adjust the facial features to the artistic style of the particular artwork in the digital story. Face replacement module 210 can interface with various camera devices hosted by device 102 or 108. In some instances, face replacement module 210 can access previously captured images, identify a face, and use those facial features when replacing faces in the digital story.

Page order management module 212 enables a user to rearrange drawings, images, and pages of the digital story. That is, drawings, images, and pages in the digital story can be rearranged in any order preferred by the user.

Pacing module 214 controls playback of the digital story. Broadly, pacing module 214 controls the rate at which pages of a story are viewed based on the user's preferences. Pacing module 214 can coordinate with timeline module 202 such that upon completion of playing audio and/or visual components related to a particular page, a next page is displayed for viewing.

Pacing module 214 can also include transition between the pages of the digital story. For example, pacing module 214 can provide various audio and/or visual transitional effects between pages, such as wipe, fade in/fade out, defocus, cut, etc. Pacing module 214 can also synchronize retrieval and/or queuing of audio and graphical files for a next page to be display.

Sharing module 216 enables digital story content generated and/or edited by the user to be shared with viewer V via network 110. In some instances, sharing module 216 enables collaboration across network 110, such that users in different locations can collaborate on the digital content. Digital stories generated and/or edited by digital story application 104 can be shared and/or exported as various file types, such as video files, that can be played within digital story application 104, within a third party application that digital story application 104 is a plugin for, and/or a separate video viewer. In some instances, sharing module 216 can enable sharing links and/or videos via various social media platforms, such as Facebook, Twitter, Instagram, and the like.

Photo integration module 218 enables texture mapping and/or replacement of backgrounds and surfaces with digital image files. For instance, photo integration module 218 can access digital image files stored locally or remotely, and replace a background with a user's photos, models, animations, and other digital renderings.

Figure 3:
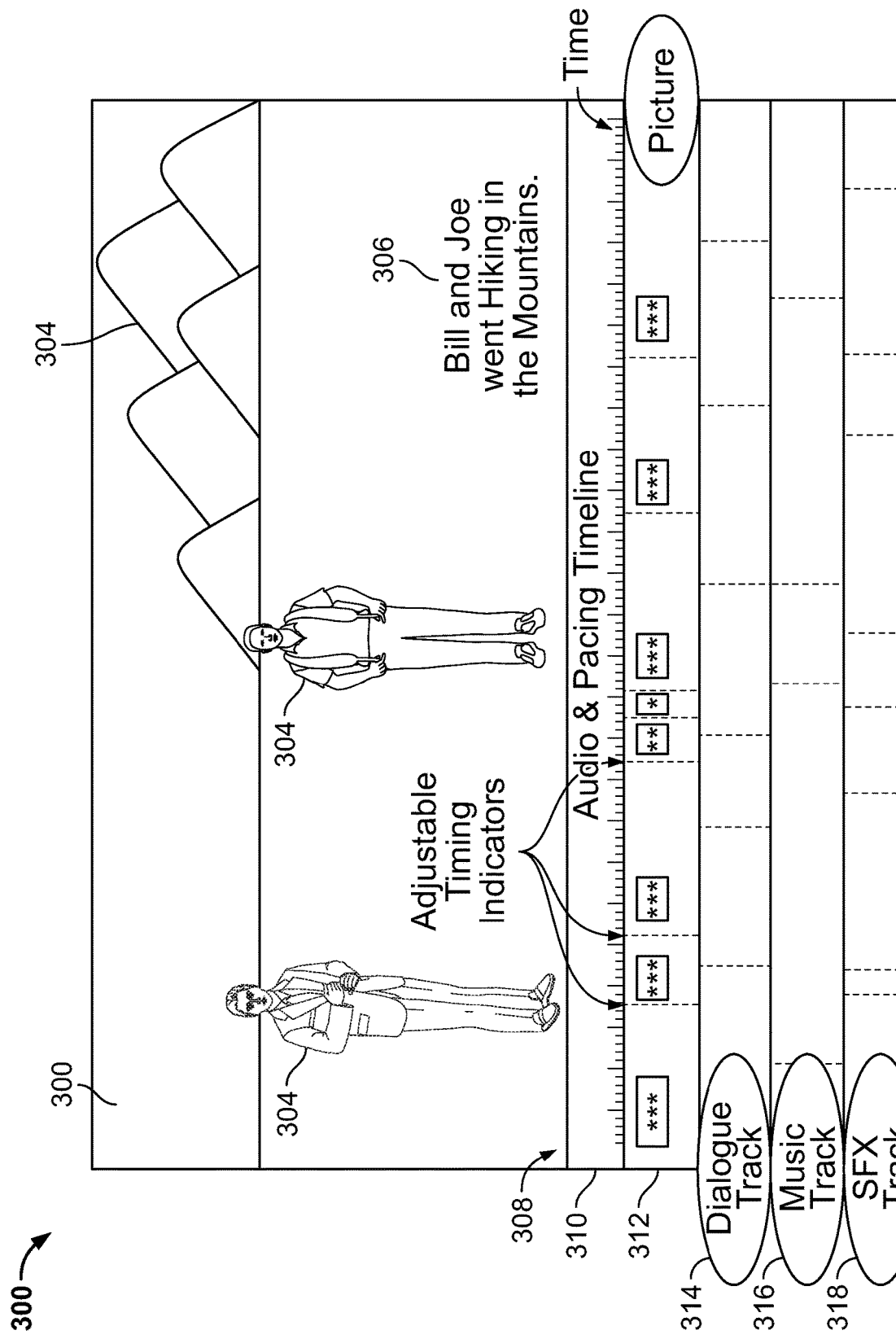
FIG. 3 illustrates an example interface provided by the example digital story application of FIG. 2.

FIG. 3 illustrates an example interface 300 generated by digital story application 104. The example interface 300 can be displayed on a variety of computing devices, as noted above. Some functionalities may be modified for mobile computing devices having smaller display screens. Other embodiments can include more or fewer components.

Generally, interface 300 enables a user to edit and generate one or more pages of a digital story. Interface 300 enables a user to view visual content and coordinate one or more audio components relating to a given page of a digital story. Interface 300 can also enable a user to view multiple pages simultaneously, reorder the pages, and/or manage transitions between pages. In some instances, interface 300 is loaded from previous work performed by a different author. Thereby, a user can modify and build upon work performed by others.

Example interface 300 includes story frame 302. Story frame 302 depicts, generally, what would appear on a page of a book. Typically, story frame 302 shows a single page of a digital story at a time. It will be appreciated that embodiments where the digital story is another form of communication, such as a greeting card, story frame 302 would correspond to one or more pages of that medium.

Within story frame 302 one or more visual aspects 304 are displayed. Within story frame 302 one or more textual aspects 306 can also be displayed. In some instances, story frame 302 enables the user to adjust the configuration and/or sizing of visual aspects 304 and/or textual aspects 306. In some instances, story frame 302 can include captions showing words that were spoken in one or more audio tracks transcribed for display on a screen.

Example interface 300 also includes timeline 308. Timeline 308 enables configuration of audio for the particular page shown in the interface 300. Using the timeline, and/or one or more other functionalities provided by digital story application 104, a user can insert new audio aspects, remove audio aspects, and change the timing and/or relative positioning of various audio aspects. Timeline 308 also enables the user to adjust pacing of a particular page.

Included in timeline 308 is elapsed time bar 310. Elapsed time bar 310 shows a scale starting at zero seconds and provides an indication of when various audio aspects play during playback of the particular page. Timeline 308 also can include visual track 312. Visual track 312 shows timing of the appearance or disappearance of various visual aspects in story frame 302. In some instances, aspects in visual track 312 are animated or recorded videos.

Timeline 308 can also include dialogue track 314. Dialogue track 314 shows relative timing of dialogue relating to story frame 302. For instance, dialogue track 314 can show timing of when a reader's voice will play during playback of story frame 302. A user can utilize dialogue track 314 to adjust spacing between playback of various dialogue files.

Example timeline 308 can also include music track 316. Music track 316 shows what type of music and at what time it is played during playback of the page. Music track 316 enables a user to select various parts, or all, of a music track. Music track 316 can also display metadata relating to the musical track, such as an artist name, a song title, and/or an album name.

Timeline 308 can also include sound effects track 318. Sound effects track 318 enables a user to manipulate the timing of various sound effects during playback of story frame 302. Sound effects track 318 can also include labels of soundtracks, such as file names or descriptions of the sound effect.

Figure 4:
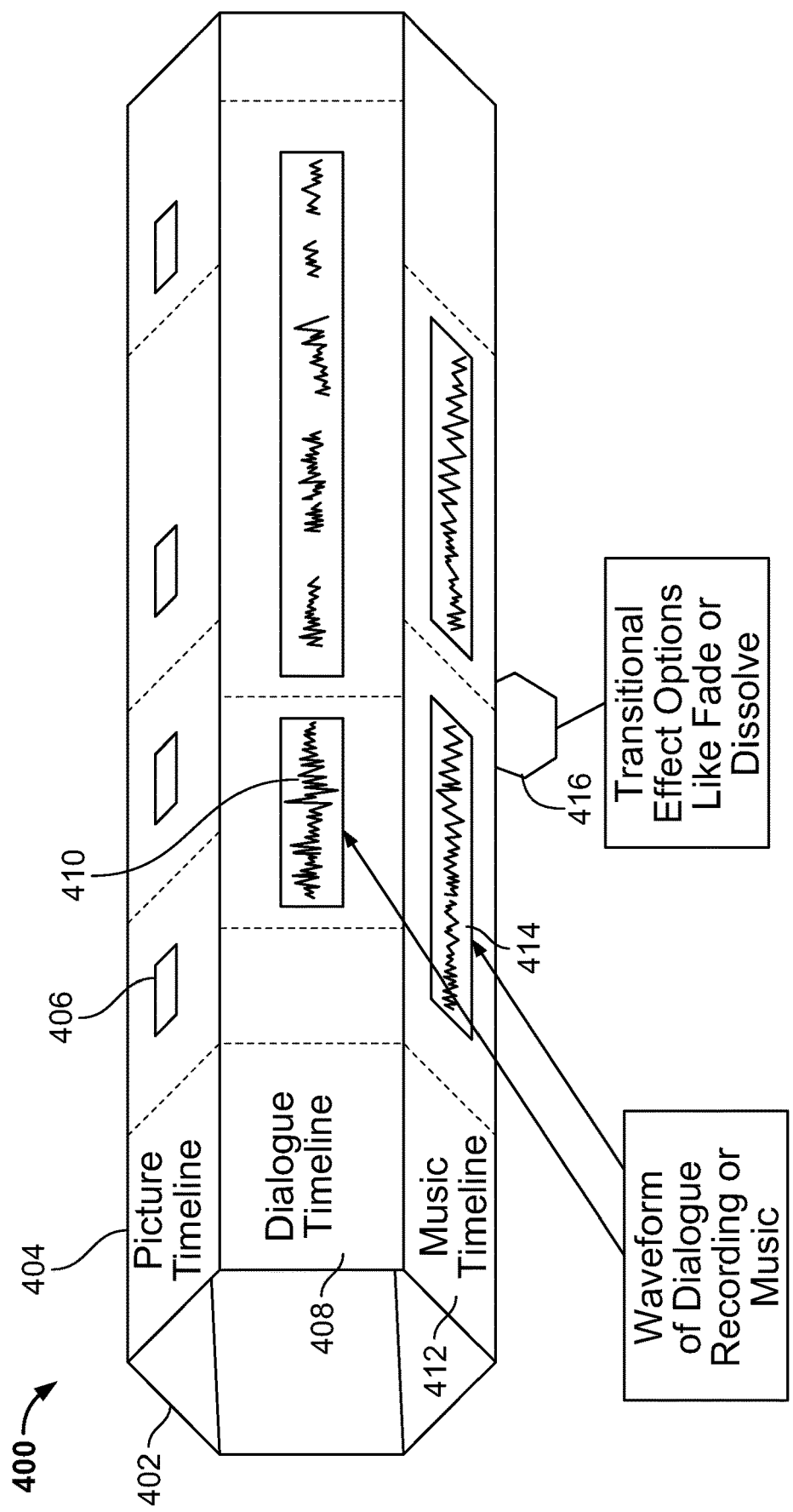
FIG. 4 illustrates another example interface provided by the example digital story application of FIG. 2.

FIG. 4 illustrates an example editing interface 400. Example editing interface 400 can be shown at the same time as example interface 300. In other instances example interface 400 appears as a separate interface from interface 300.

Example editing interface 400 includes tumbler 402. Tumbler 402, broadly, is a graphical representation of various tracks for a particular page of a digital story. In some instances, tumbler 402 can be depicted as a rotatable polyhedron, where a number of faces of the polyhedron corresponds to the number of distinct timelines for the given page in the digital story. At any given time during display of tumbler 402, one or more timelines can be simultaneously displayed. As shown, three sides of tumbler 402 are displayed. However, in other instances more or fewer timelines can be simultaneously displayed.

Example editing interface 400 includes three timelines: picture timeline 404, dialogue timeline 408, and music timeline 412. Additional timelines may be present for this particular example page of the digital story. However, any additional timelines are hidden by the sides of the polyhedron that are currently visible to the user.

Picture timeline 404 includes one or more picture thumbnails 406. Picture thumbnails 406 are shown on the timeline corresponding to when each picture is displayed during playback of the given page.

Dialogue timeline 408 includes one or more dialogue waveforms 410. Dialogue waveform 410 can be a schematic representation of a generic waveform or, an accurate rendering of a waveform corresponding to the dialogue track. Dialogue timeline 408 enables a user to control playback timing and length of each dialogue track.

Music timeline 412 includes one or more music wave forms 414. Music timeline 412 enables the user to manipulate relative timing and other playback aspects of each audio file. In some instances, music timeline 412 can include transitional effect indicator 416. Transitional effect indicator 416 can indicate that some transition is applied between different audio tracks. In some instances, transitional effect indicator 416 can also indicate a type of transitional effect, such as fade or dissolve.

Figure 5:
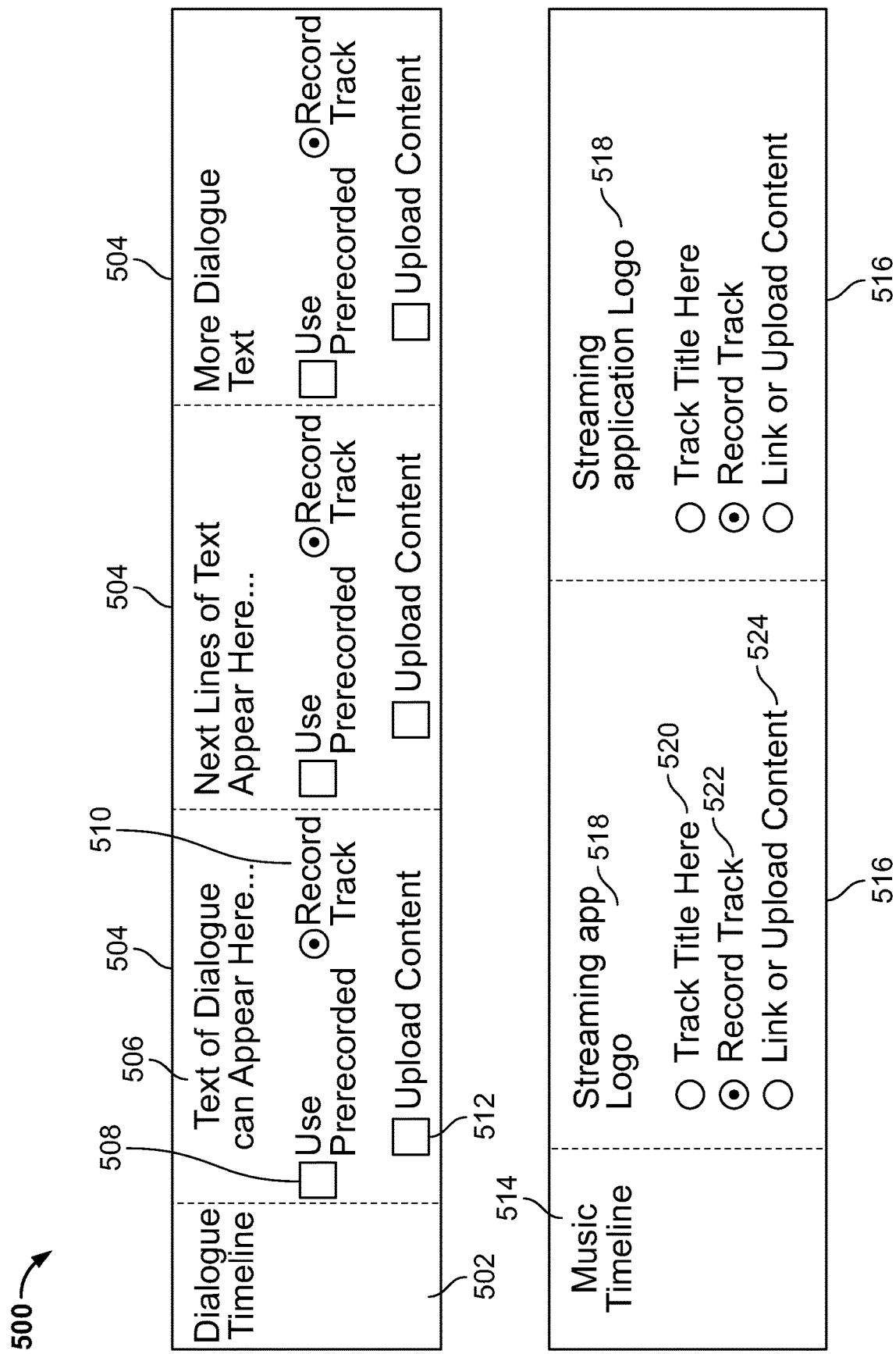
FIG. 5 illustrates another example interface provided by the example digital story application of FIG. 2.

FIG. 5 illustrates example interface 500. Example interface 500 can be displayed along with, or separately from, example interfaces 300 and/or 400. Example interface 500 enables selection of, or recording of, various attributes of the page of the digital story. For instance, interface 500 enables selection of various digital files corresponding to dialog, music, sound effects, and photographs. Accordingly, it will be appreciated that similar designs for other modules and/or timelines would be included. Dialogue and music timelines are shown in interface 500 for explanatory purposes and not as a limitation of what can be included in interface 500.

Example interface 500 includes dialogue timeline 502 and music timeline 514. Dialogue timeline 502 includes one or more dialogue parts 504. As shown, three dialogue parts 504 in dialogue timeline 502 correspond to three distinct and/or separate dialogue audio files that can be played for a particular page in the digital story.

Dialogue part 504 includes various tools for selecting digital files corresponding to dialog. In some instances, dialogue part 504 includes transcribed dialogue text 506. Dialogue part 504 can also include prerecorded selector 508. Prerecorded selector 508 enables a user to select a file stored locally or remotely that has dialog. Dialogue part 504 can also include record new track selector 510. Record new track selector 510, when selected, can initiate recording of a new dialogue track. Dialogue part 504 can also include upload selector 512. Upload selector 512 enables a user to upload recorded dialogue tracks to remote storage for later retrieval.

Music timeline 514 includes one or more music parts 516. Each music part 516 enables the user to select digital files for playback for a particular page of the digital story. Music part 516 can include streaming service indicator 518. Streaming service indicator 518 can include a logo for a particular streaming service, such as a Spotify, Napster, or iTunes logo. Music part 516 can also include track name indicator 520. Track name indicator 520 can include data about a selected digital file, such as artist name, song title, and/or file name.

Music part 516 can include record track 522. Record track 522 initiates recording of an audio file that can be used for music during playback of the page of the digital story. Music part 516 can also include upload selector 524. Upload selector 524 enables a user to link to a remote file and/or upload recorded content.

Figure 6:
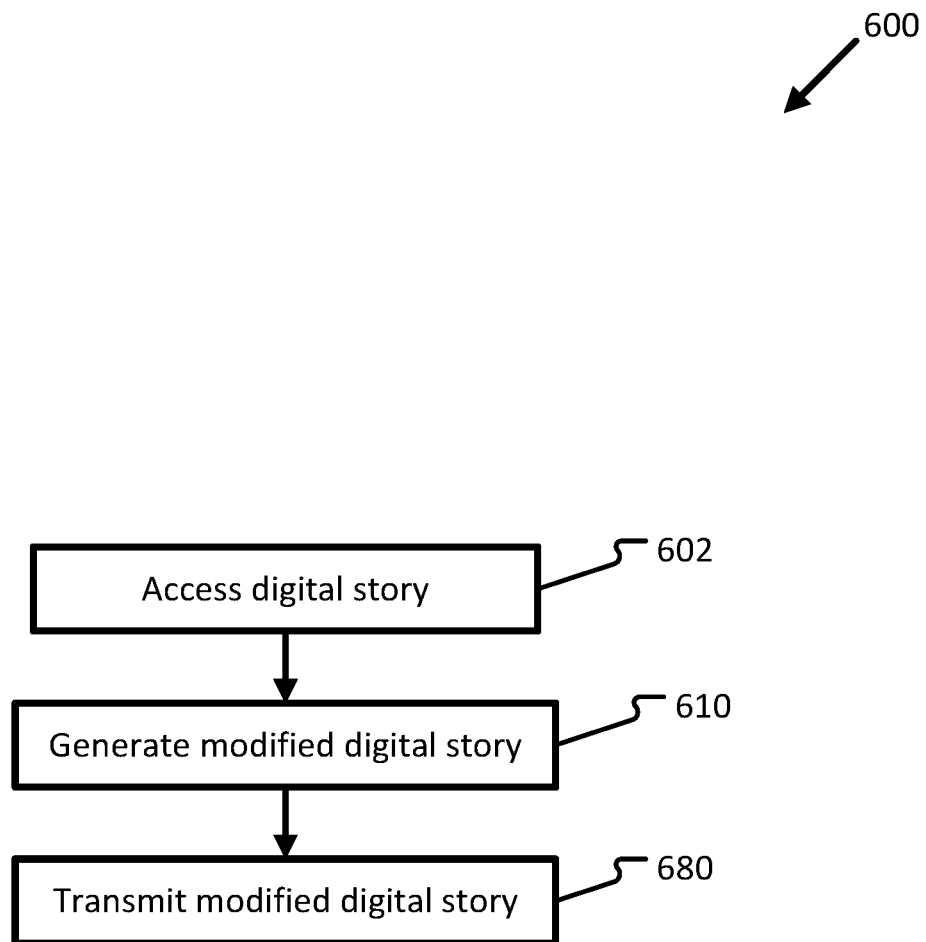
FIG. 6 shows an example method for generating a digital story using the example digital story environment of FIG. 1.

FIG. 6 shows example method 600 for generating a digital story. Example method 600 includes accessing a digital story (operation 602), generating a modified digital story (operation 610), and transmitting the modified digital story (operation 680). Although example method 600 is described in terms of editing an existing digital story, it will be appreciated that various principles and operations described below regarding example method 600 can be applied to generating a new digital story. Other embodiments can include more or fewer operations.

Example method 600 begins by accessing a digital story (operation 602). Accessing the digital story (operation 602) can include communicating with local and/or remote storage to access the digital story one and/or files associated with the digital story. For example, accessing digital story (operation 602) can include communicating with a remote server and requesting the digital story from a digital story database. Typically, the digital story will include one or more pages, where each page has visual and/or textual aspects, along with one or more audio components. Accessing the digital story (operation 602) can also include populating an interface with each aspect of the digital story (the visuals, textual aspects, and audio aspects).

Figure 7:
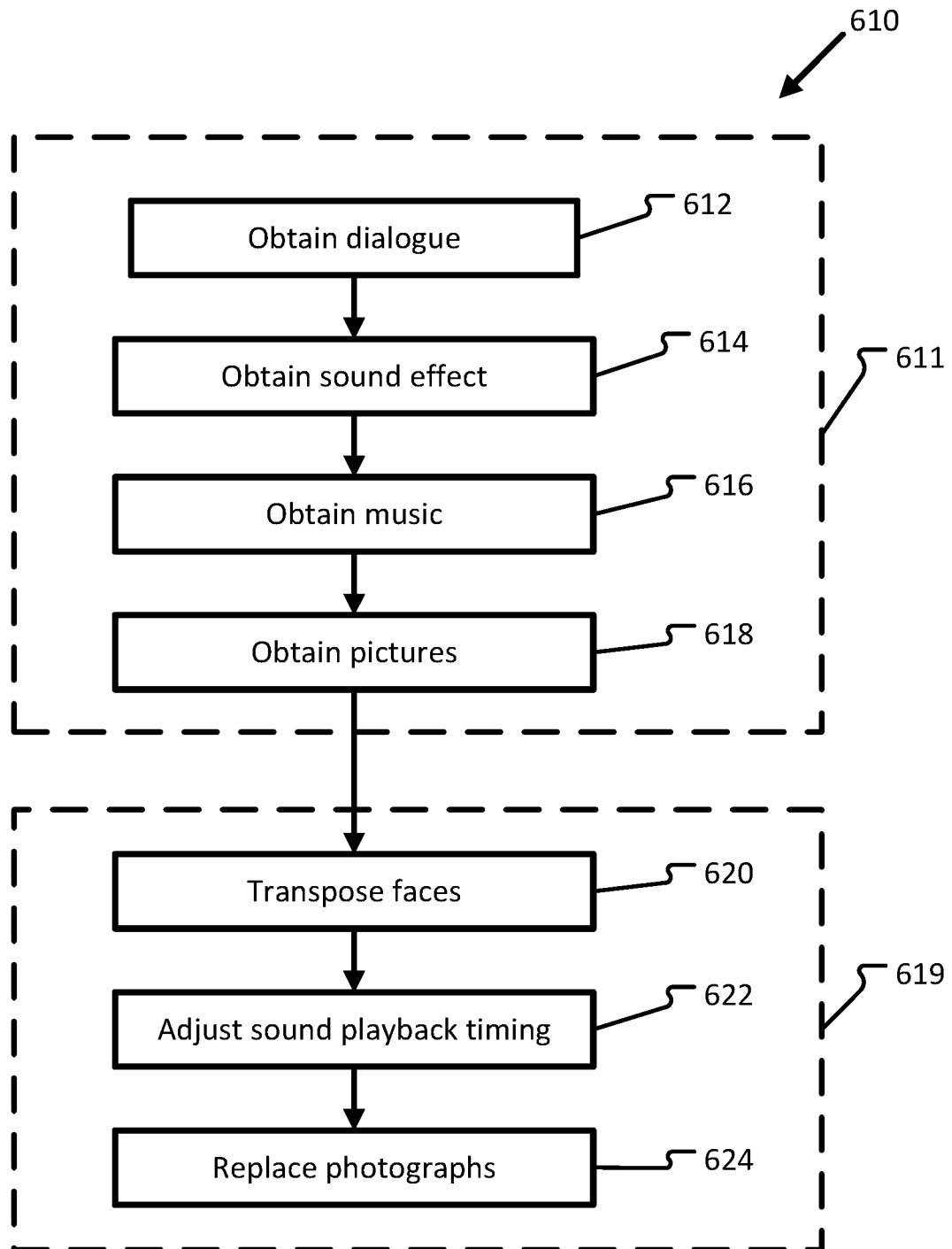
FIG. 7 shows example operations performed during the modified digital story generation operation of FIG. 6.

Next, a modified digital story is generated (operation 610) after receiving one or more inputs from a user. Referring now to FIG. 7, various operations that can be included in generating the modified digital story (610) are shown. Operations shown in FIG. 7 can be performed in a different order than that shown.

Broadly, generating a modified digital story (operation 610) can be grouped into one or more obtaining actions (operation group 611) and one or more modification actions (operation group 619). Operation group 611 typically involves obtaining pre-recorded or pre-existing files. Operation group 611 can also include obtaining live performances and recording them and generating new files, as well as capturing photographs and storing digital files of the photographs. Operation group 619 generally involves adjustments made to the page in the digital story, between playback of the pages in the digital story, and/or the timing of digital or audio aspects of the page playback.

Generating a modified digital story (operation 610) can include obtaining dialogue (operation 612). Obtaining dialogue (operation 612) can include accessing a digital audio file and/or receiving a recording of one or more dialogue tracks. Obtaining dialogue (operation 612) can also include communicating with one or more microphone devices to record dialogue from a user.

Obtaining sound effects (operation 614) can include accessing pre-recorded sound effects and/or interfacing with microphone devices to record and generate new sound files. Obtaining music (operation 616) can include accessing locally or remotely stored files of digital audio tracks. Obtaining music (operation 616) can also include determining communications through application programming interfaces with third party streaming applications. Obtaining pictures (operation 618) can include accessing locally or remotely stored photographs. Obtaining pictures (operation 618) can also include capturing one or more photographs with a camera device and saving one or more digital image files.

Transposing faces (operation 620) can include replacing faces selected by a user in one or more photographs with one or more faces identified by a user as characters in the story (or images in the story). Transposing faces (operation 620) can also include adjusting the face identified by the user to match artistic qualities of the faces in the images of the digital story.

Adjusting sound playback timing (operation 622) includes receiving indications from a user via a graphical user interface to adjust one or more of soundtrack, sound effect, dialog, and other audio aspects, and their timing during playback of the page of the digital story. Replacing photographs (operation 624) can include inserting and/or replacing background photographs for particular pages in the digital story.

Referring again to FIG. 6, after generating the modified digital story (operation 610), the modified digital story is transmitted (operation 680). Generally, transmitting the modified digital story (operation 680) involves communicating the modified digital story to another computing device for subsequent accessing, viewing, and/or editing. Accordingly, transmitting the modified digital story (operation 680) can include, for instance, communicating with a remote server and/or a database hosted by a remote server. Transmitting the modified digital story (operation 680) can also include sending a link to the modified digital story.

Figure 8:
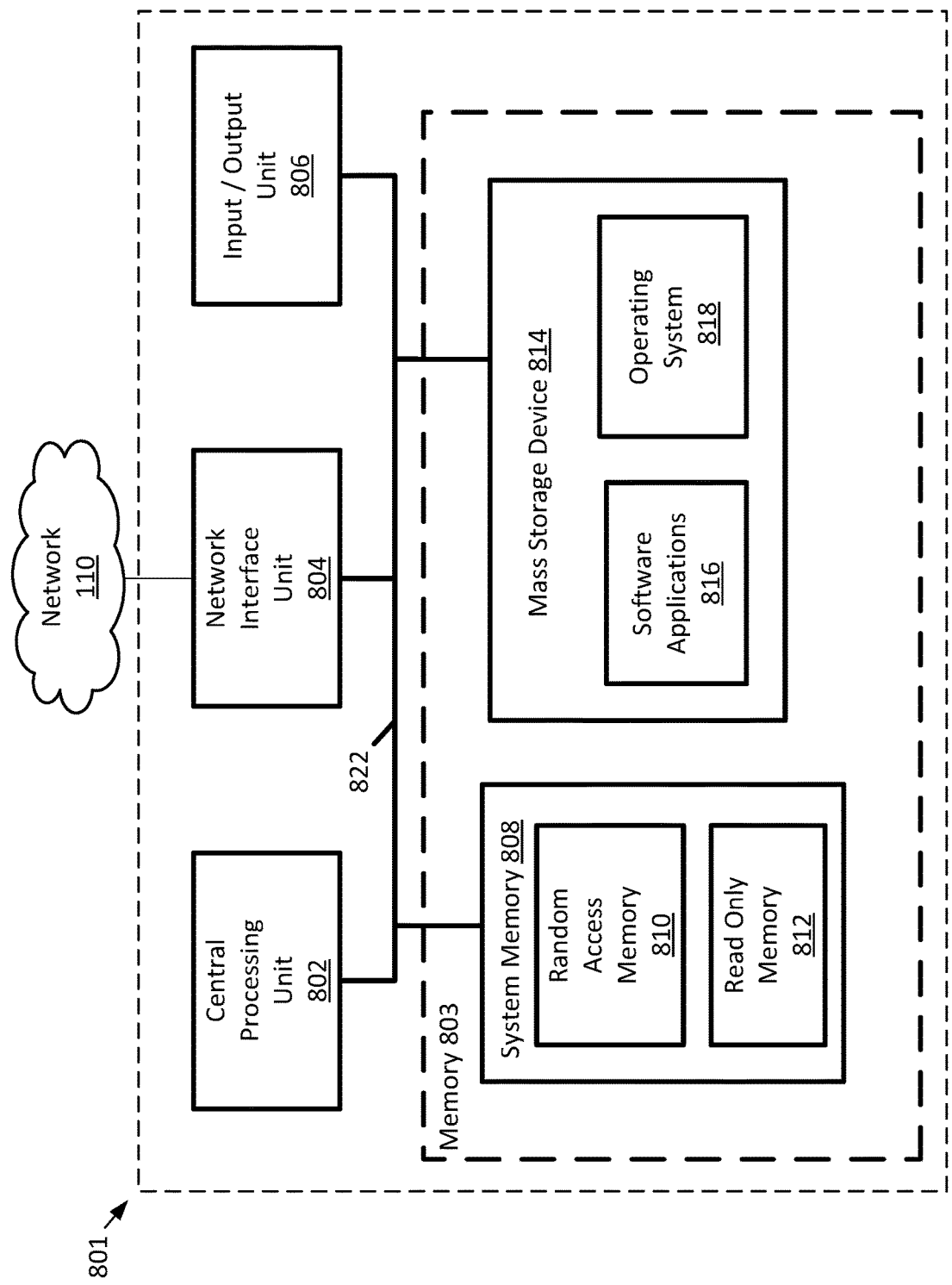
FIG. 8 shows example physical components of a computing device of the digital story environment shown in FIG. 1

FIG. 8 shows example computing device 801 used in example digital story environment 100. For instance, some or all components of example computing device 801 are found in device 102, server 106, and/or device 108. Device 102 and device 108 include mass storage device 814 hosting one or modules of digital story application 104. Digital story application 104 is capable of performing one or more operations described herein, such as example process 600.

As illustrated, the example computing device 801 includes at least one central processing unit ("CPU") 802, memory 803, and a system bus 822 that couples memory 803 to the CPU 802. Memory 803 includes system memory 808 and mass storage device 814. System memory 808 includes a random access memory ("RAM") 810 and a read-only memory ("ROM") 812. A basic input/output system that contains the basic routines that help to transfer information between elements within the example computing device 801, such as during startup, is stored in the ROM 812. Memory 803 further includes mass storage device 814. Mass storage device 814 is able to store software applications 816 and data.

Mass storage device 814 is connected to CPU 802 through a mass storage controller (not shown) connected to the system bus 822. Mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device, or article of manufacture from which a computing device can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments, the example computing device 801 may operate in a networked environment using logical connections to remote network devices through the network 110, such as a wireless network, the Internet, or another type of network. The example computing device 801 may connect to the network 110 through a network interface unit 804 connected to the system bus 822. The network 110 may be a protected network, as discussed above. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software applications 816, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to display a digital story application interface on the display screen of the example computing device 801.

PROPHETIC EXAMPLES

In a first prophetic example, a digital story environment is used in learning to read and/or learning a language contexts, particularly as a teaching aid. A digital story application provided by the digital story environment accesses a digital story from a digital story database. Then the digital story application synchronizes audio file playback with text display on each page. The audio file playback includes a dialogue track, where a reader reads text displayed on a given page. A user can select a control provided by the digital story application to repeat some or all of the dialogue track. In this way, the user can learn or re-hear pronunciation of a particular word. Coordination of audio file playback and highlighting of text on the display is also provided. For instance, the digital story application highlights each word shown in text on the screen as that word is read in the corresponding dialogue track.

In a second prophetic example, a digital story environment is used to enable a first remote party to read to a different, second remote party. Possible implementations of the second prophetic example include a parent reading to a child, where the parent and child are in different locations, such as a parent on military duty stationed away from home and a parent working remotely from their family. The first party chooses a digital story, such as a children's book, from a digital story database. Then the first party uses the digital story application to record him/herself reading the story. In some instances, the first party can also initiate video recording of him/herself reading the story. The first party can also add music and sound effects in addition to any music or sound effects that are already part of the digital story. Next, the first party shares the modified digital story with the second party, using email, social media, a subscription service, or the like. Then the second party, or a guardian of the second party, accesses the modified digital story and plays the reading for the second party. As the second party views playback of the digital story, the second party can opt to view a video of the first party reading the story. The video can be displayed in a corner portion of the interface showing the digital story.

In a third prophetic example, a digital story environment is used in an educational environment, particularly related to school environments. In the third prophetic example, a teacher would like to teach Shakespeare's Taming of the Shrew. The teacher assigns character roles to various students in the class using the digital story application. Each student accesses a digital story created for the class using a digital story application. Then each student reads and records performance of their part using the digital story application. Some students choose to incorporate music and/or sound effects to their performance. Each student's contribution is compiled into the digital story, which can then be shared via social media, email, etc., and viewed remotely, such as in the classroom. In some instances, third parties, such as an English class in a different state, can view, review, and rate each classes' performance, sometimes as part of a competition or fundraiser.

What is claimed is:
1. A digital story editing system, comprising:
   at least one processor; and
   memory encoding computer executable instructions that, when executed by the at least one processor, cause the digital story editing system to:
      receive a digital story, the digital story including a plurality of content pages;

provide a sound effect module programmed to receive a digital sound effect file;
provide a soundtrack module programmed to receive a digital music file;
provide a timeline module programmed to provide controls for playback of the digital sound effect file and/or the digital music file, including
- a picture timeline programmed to provide controls for modifying display of a plurality of pictures on each of the plurality of content pages;
- a dialogue timeline programmed to provide controls for modifying play of a dialogue on each of the plurality of content pages, including recording of custom messages;
- a music timeline programmed to provide controls for modifying play of music on each of the plurality of content pages; and
- a text timeline programmed to provide controls for modifying display of text on each of the plurality of content pages;

provide a face replacement module programmed to:
- receive a digital image file; and
- selectably replace a character face with at least a portion of the digital image file;

provide a page order management module programmed to arrange the plurality of content pages in a given order;
provide a sharing module programmed to enable collaboration and viewing between remote parties; and
provide a pacing module programmed to control an amount of time each of the plurality of content pages are displayed during a presentation of the digital story, including to provide visual and audio transitional effects between the plurality of content pages.

2. The digital story editing system of claim 1, wherein the memory encodes further computer executable instructions that, when executed by the at least one processor, cause the digital story editing system to cause the face replacement module programmed to:
use infrared and/or three dimensional imaging technology to capture facial features; and
apply those facial features to one or more characters in the digital story.

3. The digital story editing system of claim 1, wherein the memory encodes further computer executable instructions that, when executed by the at least one processor, cause the digital story editing system to cause the page order management module to allow for the rearrangement of drawings, images, and pages of the digital story.

* * * * *